July 21, 1936.   E. EGER   2,047,999
PNEUMATIC TIRE AND METHOD OF MAKING SAME
Filed Nov. 9, 1933   2 Sheets-Sheet 1
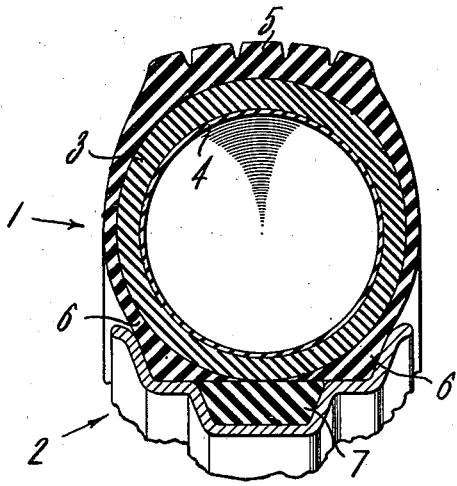
Fig. 1
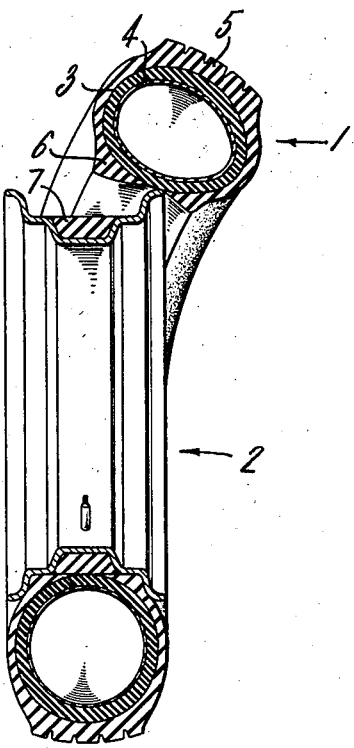
Fig. 2
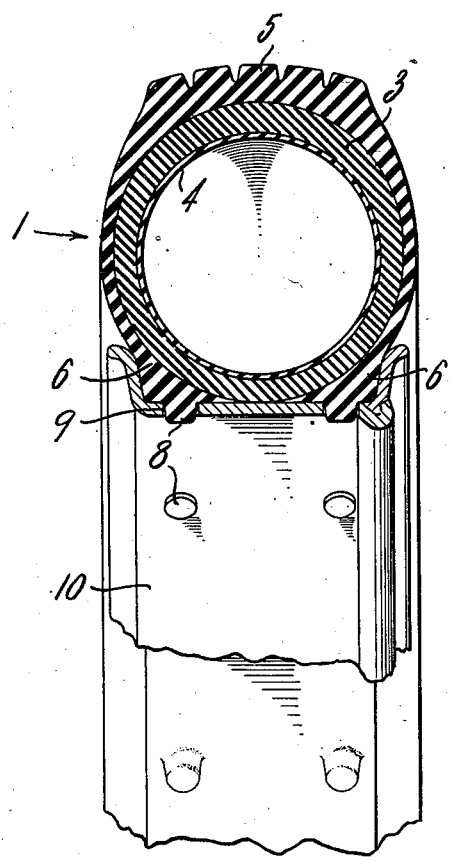
Fig. 3
INVENTOR.
ERNST EGER
BY
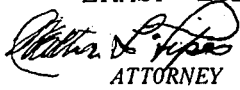
ATTORNEY

INVENTOR.
ERNST EGER
BY
ATTORNEY

Patented July 21, 1936

2,047,999

UNITED STATES PATENT OFFICE 2,047,999

PNEUMATIC TIRE AND METHOD OF MAKING SAME

Ernst Eger, Grosse Pointe Park, Mich., assignor, by mesne assignments, to United States Rubber Company, New York, N. Y., a corporation of New Jersey Application November 9, 1933, Serial No. 697,243

4 Claims. (Cl. 154—14)

My invention relates to pneumatic tires and methods and apparatus for making the same, and more particularly to tires of relatively small size for bicycles, motor cycles, aeroplanes, wheelbarrows, baby carriages, etc.

Small pneumatic tires of the class herein illustrated and described have heretofore generally been made either of circular cross section to fit a curved rim, or they have been made of annular shape with separate bead portions containing inextensible bead rings.

By the present invention I provide a pneumatic tire of small size in which inextensible bead elements are eliminated and extensible bead portions, preferably in the form of molded rubber compositions integral with a truly circular tire carcass, are adapted for mounting on conventional rims of small diameter of the flat or of the drop center type. By utilizing extensible beads as distinguished from inextensible beads, the tire may be expanded so as to slip over the retaining flanges on such rims. If desired projecting lugs or knobs may be molded on the tire to fit in complementary seats in the rim so as to prevent slippage and the use of cements or other securing means. By utilizing a carcass of true circular cross section made up of plies of cord fabric, a better arrangement of cords is obtained. This is particularly true if the tire is formed on a drum of one diameter and allowed to set on a drum of a smaller diameter. When the tire is allowed to set, the spaces between the cords at the tread portion of the tire increases, while the spaces between the cords in the bead or rim portions of the tire decreases with reference to their spacing in the plies when initially assembled. Such a compacting or crowding of the cords at the inner periphery of a tire is impossible of attainment where a non-compressible bead ring is utilized. This construction enables the use of a large number of cords per inch than is possible where all of the cords are stretched with reference to fixed bead rings.

The accompanying drawings illustrate certain present preferred embodiments of tires made in accordance with the present invention and the method and apparatus for making the same, in which Fig. 1 is a transverse sectional view of one form of tire embodying my invention;

Fig. 2 is a transverse sectional view illustrating a method of mounting a tire on a conventional rim;

Fig. 3 is a transverse sectional view of a modified form of tire and rim;

Figure 8:
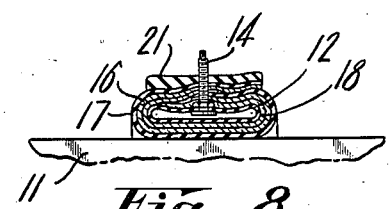
Figure 9:
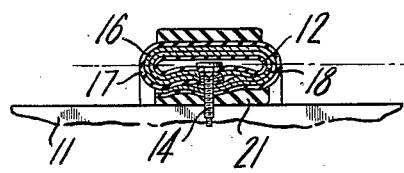
Figure 10:
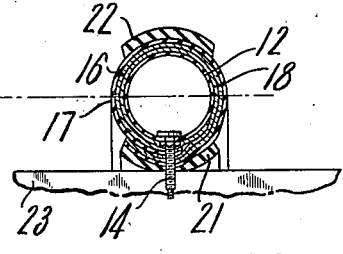

Figs. 5 to 9, inclusive, are sectional views illustrating the successive steps in forming a tire; and Fig. 10 is a sectional view illustrating the setting operation.

Referring particularly to Figs. 1 and 2, I provide a pneumatic tire 1 of small size which is shown as mounted on a rim 2 of the drop center type. The tire 1 in general comprises a carcass 3 of a plurality of plies of fabric and rubber, as hereinafter described, an inner lining or tube of rubber 4, which may or may not be puncture sealing, a tread 5 and bead portions 6.

Preferably, the carcass 3 is made in truly circular form, as the inherent tendency of such a tire is to assume a circular shape, as such shape tends to minimize and uniformly distribute carcass strains. This is of particular advantage where cord fabric is used in the carcass as the individual cords may more readily assume their final angular positions in a truly circular carcass than in a carcass of U shape. The bead portions 6 may be of resilient material, having no inextensible bead rings seated therein, in order that the tire may be slipped over the flanges of a conventional rim in the mounting and dismounting thereof, as illustrated in Fig. 2. The bead portions are preferably of the same rubber composition as the tread 5 so that the tread and bead rubbers may be applied in one and the same operation. It is to be understood that the term "rubber composition" is used to include substantially pure rubber, compounded rubber, and/or artificial or synthetic rubber compounds. A filler strip 7 may be inserted in the well of the drop center rim if the edges of the beads 6 are made substantially flat so as to fit either a drop center rim or a flat rim. The beads are shaped during the final molding operation, as hereinafter described.

By eliminating inextensible metallic bead rings and the substitution therefor of the extensible bead portions 6, and by utilizing a circular tire carcass, I dispense with the troublesome mechanics of anchoring the carcass plies to such inextensible bead elements. The bead portions 6 upon inflation of the tire 1 fit snugly against the rim flanges, thus stabilizing the tire and supporting and protecting it against side thrusts. In order to facilitate the mounting and dismounting of the tire, bead portions 6 and/or the rim may be lubricated with water or liquid soap.

Referring to Fig. 3 I have illustrated a modified form of tire construction in which a plurality of lugs or knobs 8 extend from the inner periphery of the bead portions of the tire. These knobs cooperate with complementary openings 9 in the base of a rim 10. This anchorage further strengthens the relation between the tire and rim when side flanges are provided on the rim. In case the side flanges are not provided, the knobs 8 may be relied upon to keep the tires in position on the rim. The anchoring knobs further maintain the proper relation when the tire is subjected to unusual stresses or thrusts. Such anchoring knobs may be used on tires of larger diameter which are subject to greater rolling resistance.

The tire carcass 3 is illustrated in Figs. 4 to 9, inclusive, as being of two plies of fabric, preferably cord fabric and a covering ply of rubber. However, it is to be understood that the number of plies may be varied in accordance with the nature of the service which is to be performed by the tire. Usually the cords of adjacent plies are disposed at right angles to each other. A carcass so constructed with inextensible bead portions may be stretched in the manner illustrated in Fig. 2 without any undue strain or injury to the fabric of which the carcass is composed.

Figure 4:
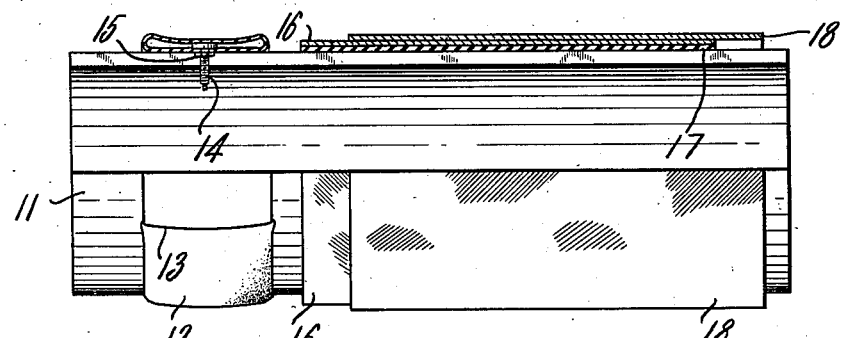
Fig. 4 is a view partially in elevation, and partly in section, of a tire building drum showing the relative positions of the parts of the assembly at the beginning of the operation.

A preferred method of constructing this tire is illustrated in Figs. 4 to 9, inclusive. As in the manufacture of bicycle tires, the tire is built on a rotatable mandrel or drum 11. The drum is provided with a longitudinal slit, as illustrated in Fig. 4, for accommodating a valve stem when it extends inwardly of the drum.

Upon the drum 11 and at one end thereof, there is placed a tube 12 of unvulcanized or semi-cured rubber. The tube 12 may be of any conventional type having a circumferential splice, or a transverse splice 13. A conventional valve stem is carried by the tube 12 and a hex nut 15 holds the tube and stem in assembled relation. The inside of the tube 12 is coated with talc or other substance to prevent the uncured rubber in the tube from sticking together during the subsequent operations.

At the opposite end of the drum a ply of cord fabric 16 is positioned with the cords extending diagonally relative to the central plane of the drum. As in conventional tire manufacture, this ply is treated with skim coats of rubber cushion stock and in addition to these it is provided with a heavy coating of tread rubber 17 which is placed next to the face of the drum 11. A second ply of cord fabric 18 is then positioned on top of the ply 16 but with their edges slightly offset. The cords in the ply 18 extend at right angles to those in the ply 16. The ply 18 is also skim coated with rubber cushion stock, but it is not provided with a coating of tread rubber. Openings 19 and 20 are punched through the plies 16, 17, and 18 at the opposite edges thereof for subsequent insertion of the valve stem 14.

Figure 5:
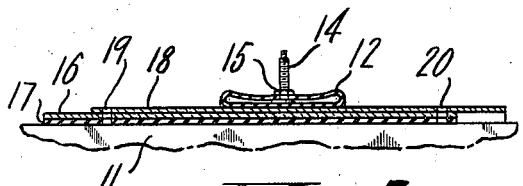

The tube 12 is manually manipulated as the drum 11 is rotated so that the tube is rolled over with the valve stem projecting outwardly and the tube is positioned in substantially the center of the assembled plies, as shown in Fig. 5.

Figure 6:
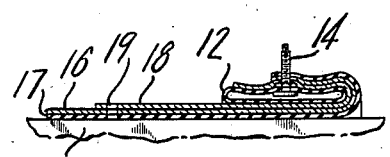

One edge of the assembled plies 16, 17 and 18, the right edge being illustrated in Fig. 6, is then turned over the tube 12 and the valve stem 14 inserted in the opening 20. The assembly is then stitched down.

Figure 7:
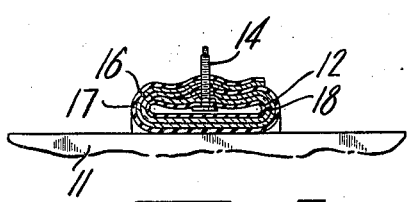

Next the left-hand portion of the assembly is treated in a similar manner so that the carcass is completely assembled and stitched in an inverted position, as shown in Fig. 7. The tread rubber 17 forms a sufficient protective coating for the carcass.

In order to supply a sufficient quantity of rubber composition to form the bead portions 6, a band of rubber composition 21 is placed on top of the inverted carcass as shown in Fig. 8. By rotating the drum and manipulating a hand tool the inverted assembly is rolled over so that the valve stem again projects into the drum from the inner periphery of the tube as shown in Fig. 9. In this position a tread rubber strip 22 is placed over the carcass and stitched thereto. Preferably, the strips 21 and 22 are of the same rubber composition as the layer 17 in order that uniform adhesion and curing may be had therebetween, but if desired different rubber compositions may be used. The assembled tire is then removed from the drum 11.

The assembly is then placed on a forming drum 23 and inflated which allows the cords to adjust themselves. By comparing Figs. 9 and 10 it will be seen that the forming drum 23 has a lesser diameter than the building drum 11. By utilizing the smaller drum 23 the carcass is permitted to expand outwardly and inwardly of a horizontal cylinder defining the transverse center of the tire. This method differs from the conventional tire manufacture where inextensible beads are used. With the inextensible beads all of the cords are spaced apart outwardly from the beads. By utilizing the extensible and contractible beads and the drum of smaller diameter, the portions of the cords above the central cylinder will be spaced further apart than in the fabric as originally assembled. The portions of the cords inside of the cylinder will tend to crowd together, due to the contraction of the beads, so that they are closer together than in the fabric as originally assembled. This condition causes a minimum movement of the cords, and consequently they are not subjected to undue strains such as occur in the shaping of tires of U shape. Also it is possible to use fabric containing more cord per inch in the finished tire than is obtainable in an equivalent tire of U shape.

The carcass is permitted to remain on the forming drum 23 until the adjustment of the cords and/or plies has substantially ceased. This time varies with the number of plies. With the two-ply construction illustrated, the time required for adjustment may vary from 10 to 45 minutes. The degree of inflation also affects this time.

The tire is then deflated and removed from the drum 23. It is placed in a conventional mold having tread and bead configurations. The tire is inflated in the mold and vulcanized in the usual manner. During the vulcanization the strip 21 is formed into the bead portions 6 illustrated in Figs. 1 and 2, while the strip 22 is given the tread configuration 5. Also the lugs 8 are formed during vulcanization, if desired.

While I have shown and described a two-ply tire, it will be understood that the number of plies may be varied as desired. I have found that a two-ply tire constructed in accordance with the present invention has a greater bursting resistance than a four-ply tire of U shape and of corresponding size having inextensible beads and which has been built by the ordinary flat band method. In an actual test the two-ply tire will burst at 300 lbs., hydraulic pressure, whereas the four-ply tire will burst at 260 lbs., hydraulic pressure. This better result I attribute to the better distribution and adjustment of the cords in the tire.

While I have shown certain present preferred embodiments of the tire and methods and apparatus for making the same, it is to be understood that the tire may be otherwise embodied and made within the spirit of the invention and the scope of the appended claims.

Having thus described my invention, what I claim and desire to protect by Letters Patent is:

1. A pneumatic tire comprising a substantially circular fabric carcass, a rubber composition tread portion, and extensible rubber composition bead portions, said bead portions having their inner faces lying in a cylindrical surface internally of the tire and continuous side wall surfaces extending outwardly therefrom to form corners to fit a conventional tire rim.

2. In the manufacture of a pneumatic tire the steps comprising superimposing a plurality of plies of rubberized fabric, forming an opening for a valve stem near each edge of the assembly, positioning a tube and attached valve stem centrally of the assembly with the valve stem extending outwardly, folding the edges of the assembly over the tube with the valve stem projecting through said openings, and stitching the assembly.

3. In the manufacture of a pneumatic tire the steps comprising superimposing a plurality of plies of rubberized fabric, forming an opening for a valve stem near each edge of the assembly, positioning a tube and attached valve stem centrally of the assembly with the valve stem extending outwardly, folding the edges of the assembly over the tube with the valve stem projecting through said openings, stitching the assembly, and applying strips of covering rubber composition to the periphery thereof.

4. In a manufacture of a pneumatic tire the steps comprising superimposing a plurality of plies of rubberized fabric, forming an opening for a valve stem near each edge of the assembly, positioning a tube and attached valve stem centrally of the assembly with the valve stem extending outwardly, folding the edges of the assembly over the tube with the valve stem projecting through said openings, stitching the assembly, and applying strips of covering rubber composition to the periphery thereof and during the vulcanization of the tire causing said strips to merge into the tire and form tread and extensible bead portions.

ERNST EGER.